UNITED STATES PATENT OFFICE.

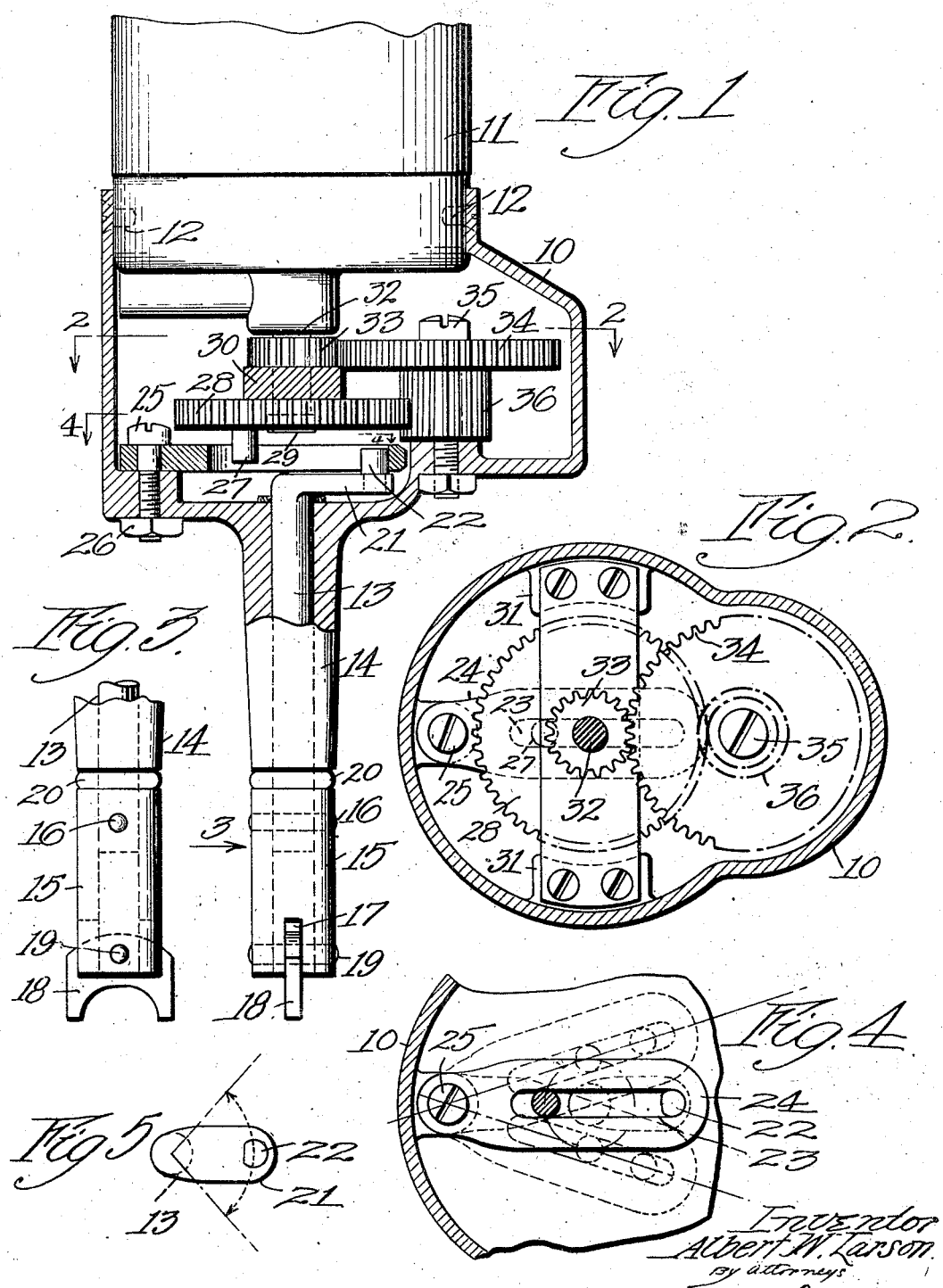

ALBERT W. LARSON, OF WORCESTER, MASSACHUSETTS, ASSIGNOR TO STENMAN ELECTRIC VALVE GRINDER COMPANY, OF WORCESTER, MASSACHUSETTS, A CORPORATION OF MASSACHUSETTS.

VALVE-GRINDER.

1,313,490.

Specification of Letters Patent.  Patented Aug. 19, 1919.

Application filed March 29, 1918. Serial No. 225,397.

*To all whom it may concern:*

Be it known that I, ALBERT W. LARSON, a citizen of the United States, residing at Worcester, in the county of Worcester and State of Massachusetts, have invented a new and useful Valve-Grinder, of which the following is a specification.

This invention relates to a valve grinder of a portable type in which a driving motor is embodied as a constituent part, and in which the valve-actuating shaft is rapidly oscillated through a fixed angle of motion.

Grinders of this general type have been heretofore known, and it is the object of my invention to improve the mechanical construction of such grinders, making them more economical in manufacture and more effective in operation.

With this general object in view, an important feature of my invention relates to the provision of simplified power transmitting connections between the motor and the valve actuating shaft, to the end that motion may be quietly and positively transmitted to the valve.

A further feature of my invention relates to the provision of connections so designed that the valve may be oscillated through a relatively wide angle of movement.

A still further feature of my invention relates to the provision of improved devices for connecting the actuating shaft to the valve, said devices permitting the grinder to be operated successively even when positioned at a considerable angle with the valve.

A preferred form of my invention is shown in the drawings in which—

Figure 1 is a partial side elevation, partly in section, of a valve grinder embodying my invention;

Fig. 2 is a transverse sectional view taken along the line 2—2 in Fig. 1;

Fig. 3 is a detail side elevation looking in the direction of the arrow 3 in Fig. 1;

Fig. 4 is a detail sectional view taken along the line 4—4 in Fig. 1, and

Fig. 5 is a detail view showing the angle through which the actuating shaft is moved.

Referring to the drawings, my improved valve grinder comprises a casing 10, to the upper end of which a motor 11 may be secured in any convenient manner, as by screws 12. A valve actuating shaft 13 has an elongated bearing in a hub 14 extending downwardly from the casing 10.

Connection may be made in any convenient manner between the shaft 13 and the valve to be ground. In the drawings I have shown a sleeve 15 secured to the end of the shaft 13 by a pin 16, said sleeve being slotted at 17 to receive a valve engaging plate 18 which is pivotally secured by a pin 19. The lower end of the plate 18 may be formed as indicated in Fig. 3, or may be given any other shape necessary to coöperate with any particular type of valve. It will be evident that the plate 18 can be rocked in its slot 17 to a certain extent, and that the grinder is thus enabled to continue its oscillation of the valve even though positioned at a considerable angle thereto. A thrust collar 20 of vulcanized fiber or other suitable material may be inserted between the hub 14 and the sleeve 15.

The shaft 13 is preferably formed with an integral crank arm 21 at its upper end, said arm having a crank pin 22 secured in the upper side thereof. The pin 22 extends into a slot 23 formed in a lever 24 mounted on a pivot 25 fixed in the casing 10. In the form shown in the drawings, the pivot 25 is a shoulder stud threaded into the casing and having a check nut 26 to prevent displacement thereof. The slot 23 extends longitudinally of the the lever 24 and receives not only the crank pin 22, but an additional crank pin 27 mounted on a gear 28 rotatable upon a stud 29 supported by a cross bar 30 which in turn is secured to lugs 31—31 on the side walls of the casing 10.

The gear 28 is alined with the shaft 32 of the motor 11, to which shaft is secured a pinion 33 meshing with an intermediate gear 34 pivoted on a stud 35 fixed in the casing 10. A pinion 36 is rotatable with the gear 34 and engages the crank pin gear 28. The gears 33, 34, 36 and 28 thus constitute a train of reduction gearing between the motor shaft 32 and the crank pin 27, and the crank pin is continuously moved thereby in a circular path but at reduced speed.

As the pin 27 rotates, the lever 24 is given an oscillating or reciprocating motion as indicated in Fig. 4, and such motion is communicated through the crank pin 22 and crank arm 21 to the actuating shaft 13. As the crank pin 22 is farther from the pivot 25 of the lever 24 than is the crank pin 27, it will be evident that it receives a magnified motion therefrom. Furthermore, as the crank arm 21 is much shorter than the lever 24, the increased motion of the crank pin 22 will result in largely increased angular movement of the actuating shaft 13. The magnitude of this movement in my preferred construction is indicated by the broken lines in Fig. 5.

Having thus described my invention, it will be seen that I have provided extremely simple and durable power transmitting connections by means of which the actuating shaft may be rapidly oscillated through a relatively wide angle. It will also be evident that changes and modifications can be made therein by those skilled in the art without departing from the spirit and scope of my invention as expressed in the claims, and I do not wish to be otherwise limited to the details herein disclosed, but what I do claim is:—

1. A valve grinder comprising a casing, a shaft mounted to oscillate therein and having a crank arm thereon, a lever mounted on a pivot fixed in said casing at a point removed from the axis of said shaft, said lever extending transversely of the axis of said shaft and having a pin and slot connection with said crank arm, a motor mounted in said casing, a crank pin mounted for movement in a circular path by said motor, and a slot in said lever positioned to receive said crank pin whereby rotary movement of said crank pin effects a certain oscillatory movement of said lever and a greater oscillatory movement of the shaft connected thereto.

2. A valve grinder comprising a casing, a shaft mounted to oscillate therein and having a crank arm thereon, a lever mounted on a pivot fixed in said casing at a point removed from the axis of said shaft, said lever extending transversely of the axis of said shaft and having a slot and said crank arm having a pin extending into said slot, a motor mounted in said casing, and a second crank pin mounted for movement in a circular path by said motor and also extending into said slot in said lever, whereby rotary movement of said second crank pin effects oscillatory movement of said lever and resultant increased oscillatory movement of said crank arm, the axes of said motor and said shaft coinciding with the axis of movement of said second crank pin.

In testimony whereof I have hereunto affixed my signature.

ALBERT W. LARSON.